United States Patent [19]

Conville

[11] Patent Number: 4,782,642

[45] Date of Patent: Nov. 8, 1988

[54] METHOD AND APPARATUS FOR PANEL EDGE COUPLING

[76] Inventor: David J. Conville, 316 N. Point Lookout, Hot Springs, Ark. 71913

[21] Appl. No.: 67,369

[22] Filed: Jun. 29, 1987

[51] Int. Cl.$^4$ .......................... E04B 1/40; E04G 23/02
[52] U.S. Cl. ...................................... 52/770; 52/514; 52/584; 52/714
[58] Field of Search ................ 52/514, 489, 584, 703, 52/714, 98

[56] References Cited

U.S. PATENT DOCUMENTS

| | | | |
|---|---|---|---|
| 2,317,428 | 4/1943 | Anderson | 52/714 X |
| 2,799,058 | 7/1957 | Swenson | 52/714 X |
| 3,289,374 | 12/1966 | Metz | 52/514 |
| 3,958,388 | 5/1976 | Hawes | 52/584 |
| 4,448,007 | 5/1984 | Adams | 52/714 X |

FOREIGN PATENT DOCUMENTS 610386 4/1979 Switzerland .......................... 52/714

Primary Examiner—J. Karl Bell
Attorney, Agent, or Firm—Stephen D. Carver

[57] ABSTRACT

Methods and apparatus for joining or repairing wall or ceiling panels such as sheet rock, gypsum boards, plywood, or other generally planar wall panels. Means are provided for permanently joining the edges of wallboard panels, ceiling panels, or the like at any desired position along the length of the wall frame or ceiling framework independent of framing backup studs or joists. Each embodiment of the invention contemplates the use of a plurality of metallic clips adapted to provide a working union or edgewise mechanical bond between adjacent panel edges, by creating an artificial backing in wall regions having no studs or support columns. A preferred clip comprises a generally planar, elongated body having a pair of parallel of reinforcement grooves, and the whole body is preferably stamped from perforated metal stock. A pair of integral, spaced apart, prong-like spring tab structures are formed on opposite sides of the clip body to grasp the edges of a panel. Each spring tab includes an integral, upwardly extending vertical portion disposed substantially perpendicularly to the body and an integral, outwardly curved substantially horizontal flange portion. The horizontal flange portion is separated from its vertical companion by a weakened, scored tear edge which permits manual weakening and removal of the flange by appropriate bending after clip installation. In the preferred clip the spring tabs project towards the clip front to maximize the working area of the body available for fastening to the second or later panels.

8 Claims, 4 Drawing Sheets

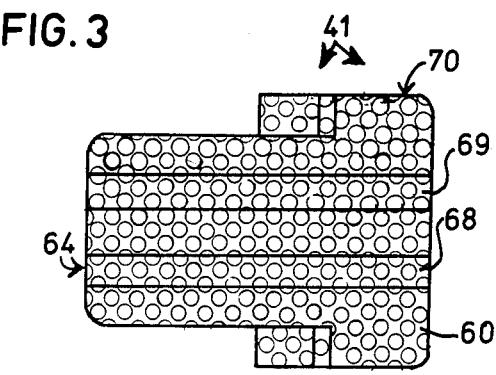
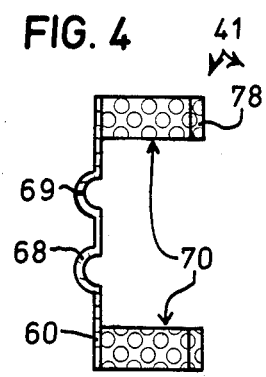
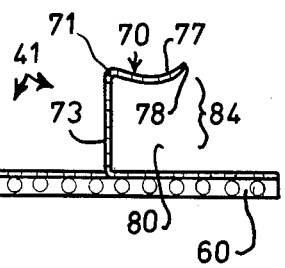
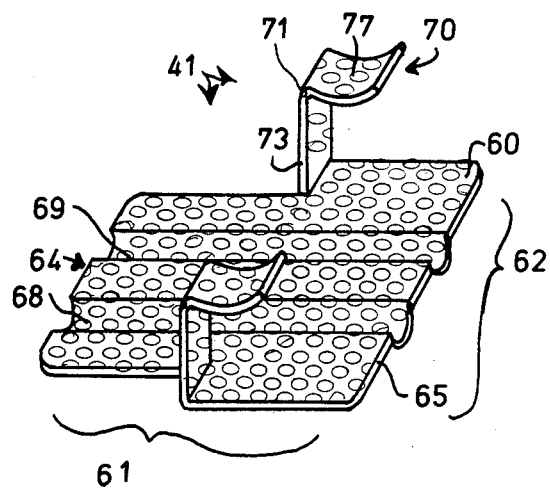
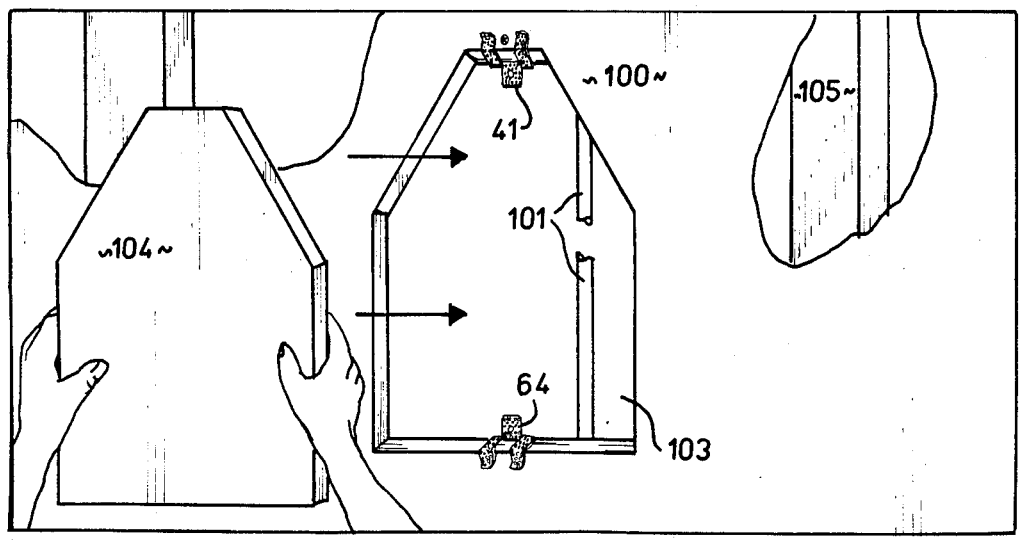
FIG. 7

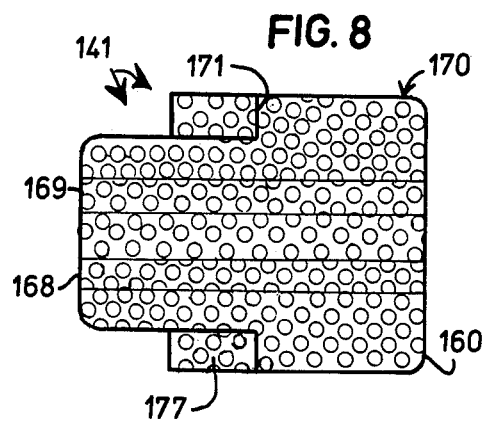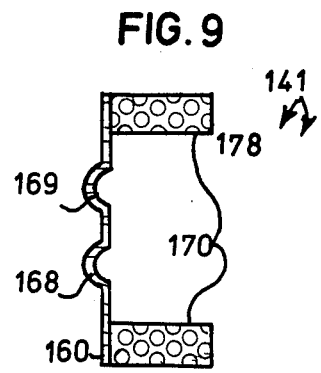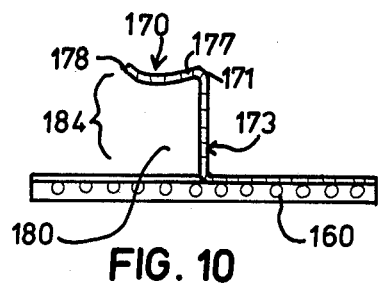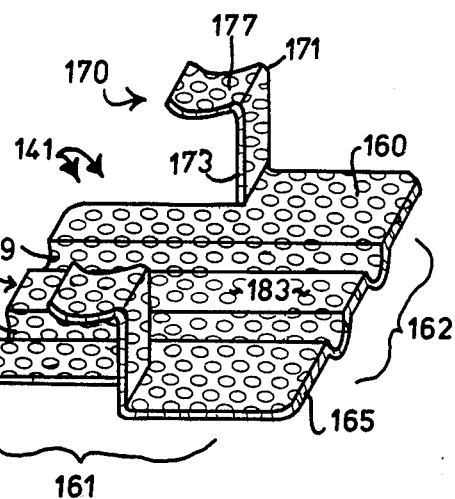
FIG. 8  FIG. 9  FIG. 10  FIG. 11
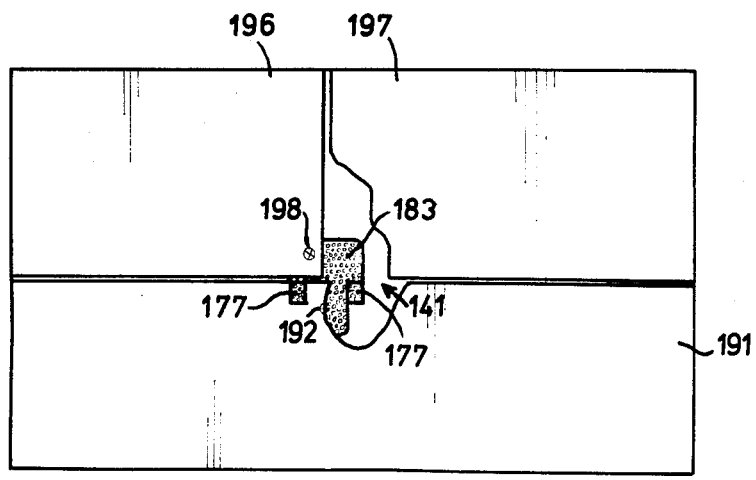
FIG. 12

METHOD AND APPARATUS FOR PANEL EDGE COUPLING

BACKGROUND OF THE INVENTION

The present invention relates generally to methods and apparatus for joining wall or ceiling panels such as gypsum wallboard or drywall. More particularly, the present invention relates to a method and apparatus for permanently joining the edges of wallboard panels, ceiling panels, or the like at any desired position along the length of the wall frame or ceiling framework independent of framing back-up studs or joists. It is believed the invention is classified in U.S. class 52, subclass 489 or 703.

As will be appreciated by those skilled in the art of wall construction, conventional "drywall" gypsum wall board of fourfoot width are customarily nailed, screwed or stapled to a substructure of vertical framing studs typically constructed of wooden two-by-fours spaced apart at sixteen or twenty-four inch intervals. Using conventional methods of wall construction, a builder will typically align one edge of the wallboard with the central axis of a framing stud. In the application of gypsum panels in the vertical plane walls it is customary to measure the distance from one end of the panel to the middle of the stationary backing nearest the other end of the panel. The panel is then cut back to the middle of the stud. Thus the next panel can be attached to the same stud and the procedure repeats itself. When the board is thus correctly positioned, it will be permanently fastened to the stud upon any one of a wide variety of conventional fasteners, such as clamps, nails, screws, clips, or the like. The wallboard will typically be extended over to meet the central axis of the next proximate vertical framing stud, where the center of the board will be similarly permanently fastened. Thus eight, ten, twelve, fourteen etc., foot widths of wallboard will extend between many of the vertical studs spaced at twenty-four inches or sixteen inches.

The fastening of conventional wall panels would entail no particular difficulty or waste where the framing stud spacing "matches" standard factory gypsum lengths. However, it is almost always necessary to space the framing studs closer together on irregular or shortened walls, on cathedral ceilings, at corners, and about doors. In such instances, the wallboard panel is fastened at one edge to the center of a vertical stud and extended across the frame to the next proximate studs. Any length of panel which extends beyond the center of the last proximate stud will then be cut away from the board and simply discarded. Although time savings may be achieved, a substantial amount of wallboard material is also typically wasted, resulting in higher costs. Moreover, the discarded scrap material is virtually never profitably reclaimed.

Similarly, the repair of damaged wallboards or the opening and removal of an inspection plate requires that a complete section of the wallboard be removed. It is very difficult for replacement sections or strips to be thereafter properly fastened in place when no stud or ceiling joists is readily proximate for anchoring or backup.

Prior art panel fastener devices known to me fail to address the desirability of joining wallboard panels together along the expanse of the frame where no vertical framing studs are disposed. Representative of the broad prior art panel fasteners which are adapted to be fastened to vertical studs are U.S. Pat. No. 4,127,975, issued to Judkins on Dec. 5, 1978; U.S. Pat. No. 4,448,007, issued to Adams on May 15, 1984; and U.S. Pat. No. 4,333,286, issued to Weinar on June 8, 1982. The earlier fastener system described in Judkins, U.S. Pat. No. 4,127,975, comprises a rigid clip adapted to anchor the edges of prefinished wall board panels to steel or framing studs. The Judkins clip includes a pair of sharpened points which are adapted to penetrate the soft interior gypsum of the wallboard. However, the '975 fastener cannot be used to join panel edges independent of a supporting stud or joist. Moreover, a special application tool is normally required to provide sufficient driving force to penetrate the gypsum board.

One prior art method and apparatus for joining panel edges is described by Bains, U.S. Pat. No. 4,363,201, issued Dec. 14, 1982. Bains provides a pair of channel members which are permanently fastened to a vertical stud upon insulative spacer members. The reference fails to provide means or apparatus for joining panels independent of vertical studs or similar framing members. Other similar prior art systems of somewhat lesser relevance are disclosed in U.S. Pat. Nos. 3,308,589; 3,038,276; 3,529,918; and, 4,366,660. Finally, a variety of other wallboard fasteners or clips exist in the prior art which are used for securing wallboards to framing members at corners. Among such prior art devices known to me are the clip of Conville, U.S. Pat. No. 3,881,293, issued May 6, 1975; of Adams, U.S. Pat. No. 4,498,272 issued Feb. 12, 1985; and of U.S. Pat. No. 3,688,459, issued to Mattix on Sept. 5, 1972.

None of the prior art systems known to me provide means for properly fastening wallboard or ceiling panels independently of supportive framing members. Moreover, none of the prior art systems of which I am aware provide or suggest means for conveniently temporarily fastening panels in position to permit the worker freedom of movement to assure proper alignment before fastening. Neither do the prior art devices known to me disclose or suggest means for effectively securing a patch or a section of panel to an existing panel member independently of framing members.

Certain prior art dry wall repair kits do exist however, and two known kits are sold under the trademarks PRO PATCH and THE WALL DOCTOR. Both kits require the cutting of an appropriately dimensioned orifice in the damaged wallboard prior to fitting of a repair piece. And, in both instances, the repair piece is cemented or "glued and taped" in place without the use of any appropriate anchoring clips or fasteners. Without appropriate edgewise peripheral bracing, the repair panels or inserts fail to rigidly unite with the repaired wall board, and noticeable misalignment may occur.

SUMMARY OF THE INVENTION

The present invention comprises methods and apparatus adapted to couple or join two sheets or panels of materials such as gypsum wall board or plywood panels together at their edges when they meet between studs or joists. The present invention facilitates edgewise unions without requiring stationary rearward support from the studs of columns which normally back-up wall boards, and it provides a repair system for fixing or patching relatively small broken sections of wall board and the like.

Each embodiment of the present invention employs one or more clips constructed in accordance with the teachings hereinafter presented for effectively providing an artificial backing in wall regions having no studs or support columns. A preferred clip comprises a generally planar, elongated body having a pair of parallel of reinforcement grooves, and the whole body is preferably stamped from perforated metal stock. All metallic body ends and edges are rounded or radiused to soften and enhance handling. A pair of integral, spaced apart, prong-like spring tab structures are formed on opposite sides of the clip body to grasp the edges of a panel. Each spring tab includes an integral, upwardly extending vertical portion disposed substantially perpendicularly to the body and an integral, outwardly curved substantially horizontal flange portion. The horizontal flange portion is separated from its vertical companion by a weakened, scored tear edge which permits manual weakening and removal of the flange by appropriate bending after clip installation. In the preferred clip the spring tabs project towards the clip front to maximize the working area of the body available for fastening to the second or later panels.

For installation a clip may be manually grasped and forced such that the spring tab structure appropriately couples the clip to a wall board edge, with the wall board sandwiched between the parallel flange portion and the clip body. Spring-like bias from the parallel flange portion will at least semi-permanently maintain the clip in a suitable position. Thereafter a self tapping screw is forcibly installed through the wall board into penetrating engagement with the clip body, to permanently affix the clip to the panel. After a second board is installed or oriented in edgewise abutment with the "clipped" first board, additional screws correctly targeted and driven through the second wall board will securely engage the perforated clip, and the panels will thus be coupled together. Targeting of fasteners is expedited by visually aligning the appropriate screw relative to regions broadly defined and located by the clip flanges. The clip horizontal flange portions may then be manually bent and torn off.

The clips of the present invention may also be employed to make aesthetically pleasing repairs or alterations to wall boards. In use an artificial backing is established by the clips, and this provides rearward support for either the original or a replacement wall board piece.

Thus a fundamental object of the present invention is to provide methods and apparatus for permanently joining together wallboard panels of a wall independent of a framing stud or other wall-supporting substructure, and to firmly secure them together.

A similar fundamental object of the present invention is to provide a flexible fastener apparatus for fastening together wallboard panels in the manner described.

Another basic object of the present invention is to provide a method for joining irregular panels or pieces of wallboard independent of a stationary back-up framework.

A similar object of the present invention is to provide a method and a fastener apparatus to facilitate quick and convenient patch or repair of a wallboard panel.

A still further object of the present invention is to provide a method and a fastener apparatus of the nature described for temporarily fastening wallboard or ceiling panels in position between ceiling joists.

Still another object of the present invention is to provide a method for fastening wallboard, ceiling, or other panels which can be quickly and conveniently accomplished without the use of specialized applicator tools.

Another important object of the present invention is to readily permit or enable an installer to attach or lock sheets or panels in place between stationary members when working with sloped planes such as those encountered with cathedral ceilings.

A further object of this invention is to allow irregular panels or pieces of material such as gypsum board which may have been intentionally cut out and temporarily removed to be rejoined with the wall whether or not a supportive stud or column is available. It is a feature of the present invention that the disclosed fastener device may be attached to the existing gypsum and cut-out piece simply re-inserted into the wall.

A still further object of the present invention is to provide an improved fastening clip of the character described which is adapted to concurrently fasten three (3) or more abutting panels together in their region of intersection;

A still further object of the present invention is to provide a clip structure of the character described which can be combined with an after market repair kit for quickly finishing broken dry wall, gypsum wall board, Sheet Rock-brand dry wall board or the like by the "do-it-yourself" market.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is a top plan view of a fastener clip;

FIG. 4 is an end elevational view of a fastener clip;

FIG. 5 is a side elevational view of a fastener clip;

FIG. 6 is an isometric view of a fastener clip;

FIG. 7 is a pictorial view illustrating use of a clip of the present invention to fasten an inspection plate to effectuate subsequent wall repair;

FIG. 8 is a top plan view of the preferred fastener clip;

FIG. 9 is an end elevational view of the preferred clip;

FIG. 10 is a side elevational view of the preferred clip;

FIG. 11 is an isometric view of the preferred clip;

FIG. 12 is an enlarged fragmentary view illustrating how the preferred clip of FIGS. 8–11 can be used to join three intersecting panels in the region of intersection; and, FIGS. 13 through 20 are a plurality of fragmentary, diagrammatic and pictorial views illustrating step by step instructions for repairing a wall panel in conjunction with the "kit" form embodiment of the present invention.

DETAILED DESCRIPTION

Figure 1:
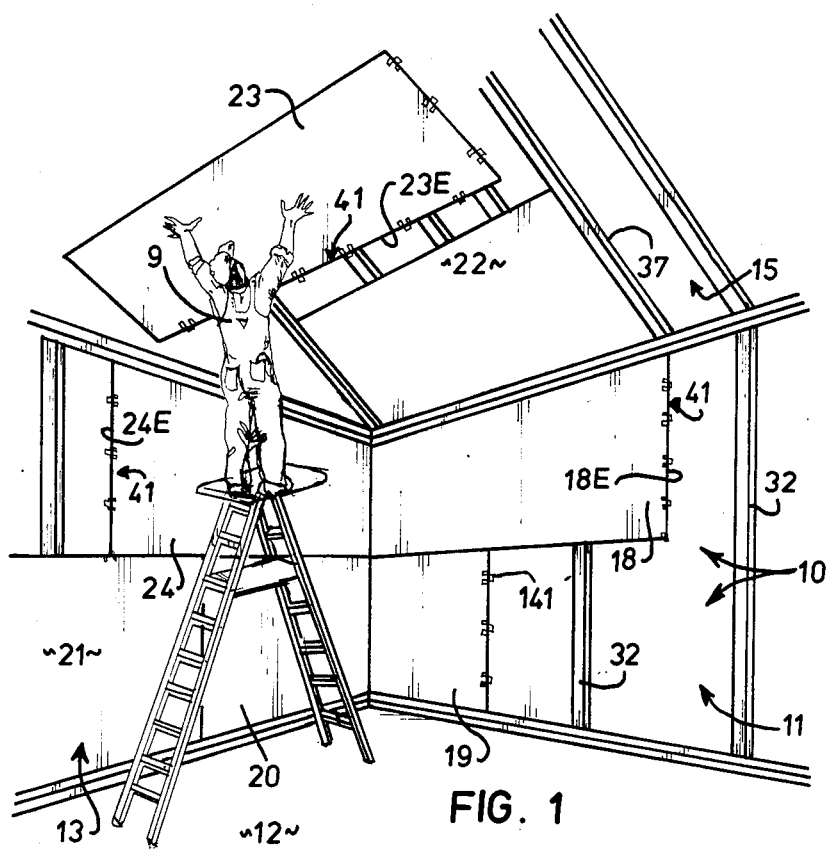
FIG. 1 is pictorial view illustrating various wall boards and the placement of a ceiling panel in accordance with the teachings of the best mode of my invention.

With initial reference now directed to FIG. 1 of the appended drawings, a typical wall construction zone has been generally designated by the reference numeral 10. As will be appreciated by those skilled in the art, the walls generally indicated by the reference numerals 11 and 13 rise upwardly from the floor 12 forming a junction with the roof structure 15. Both walls 11 and 13 are constructed from a plurality of abutting and properly fitted wall boards such as gypsum wall board panels 18–24. Panels 23 and 22 are to be installed upon the roof structure. A typical wall board panel will normally be nailed or otherwise fastened to one or more of a plurality of spaced apart studs 32 or 33.

Usually wall boards must be cut to size, so that as viewed in FIG. 1, the portion of board 18 overlying column 32 would normally be cut away and discarded. The dimensions of the discarded portion would be somewhat related to the stud spacing, which is generally sixteen or twenty four inches. It will be noted that board 18 has not been trimmed. Its edge 18E terminates in a region without a column or a stud, and it has been provided with a plurality of fasteners such as clips 41 or 141 coupled to its edge 18E. It will be noted that the workman 9 installing ceiling board 23 has similarly installed a plurality of fastener clips along panel edge 23E so that he may more easily join board 23 to board 22. A plurality of suitable clips 41 or 141, which will hereinafter be described in more detail, are used in conjunction with all methods of the present invention.

Figure 2:
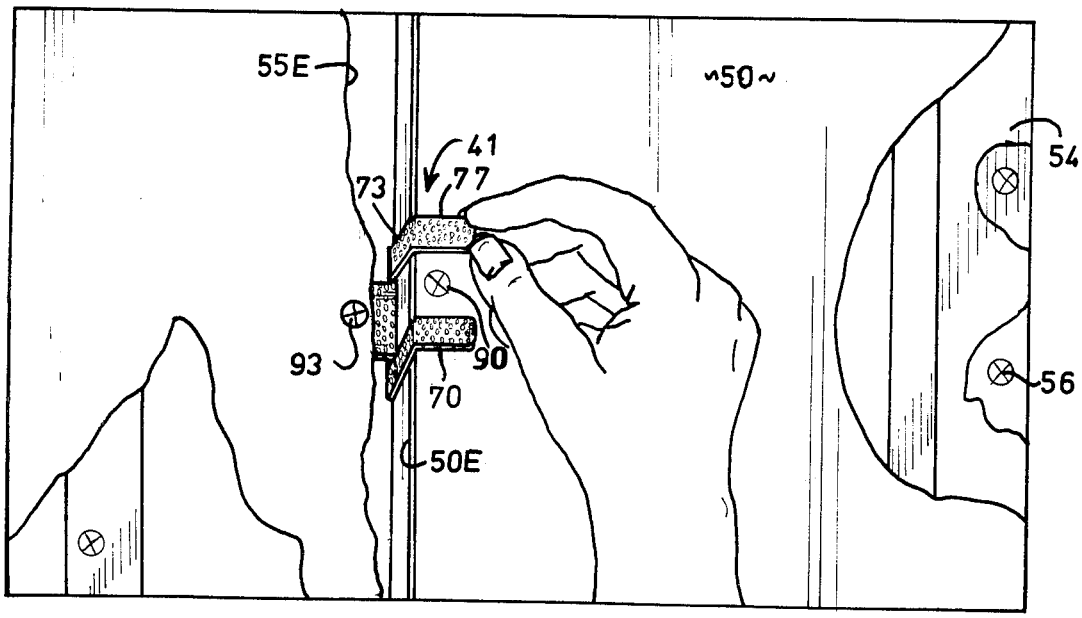
FIG. 2 is an enlarged, fragmentary pictorial view of a fastener clip disposed in operative position wherein two panels are secured in edgewise abutment.

With reference now to FIG. 2 it will be noted that a typical clip 41 is fastened to the edge 50E of a wall board such as gypsum board 50 or the like. As revealed in FIG. 2, the vertical support column 54 may usually anchor wall boards with typical fasteners 56, and thus it is the conventional technique to merely cut the edge of board 50 and discard the remaining "odd" piece. Instead, FIG. 2 will reveal that an adjacent wall board 55 may be securely fastened at its edge by use of a clip 41 or 141 independently of any column to provide secure edgewise bracing.

With additional reference directed now to FIGS. 3 through 6, clip 41 comprises a generally planar, elongated body 60 having a length 61 and a width 62. The front 64 of the body is spaced apart from the rear 65 thereof, and preferably a pair of parallel reinforcement grooves 68 and 69 run the length of the body 60. The body portion is preferably stamped from perforated metal stock. The preferably two parallel "V" shaped ribs or grooves 68, 69 extend the full length of the body, and significantly improve resistance to bending moments. The body ends are rounded or radiused to soften and enhance handling. It will be apparent that a pair of spaced apart spring tabs, generally designated by the reference numeral 70, are integrally formed on opposite sides of the clip body 60. The prong-like spring tab assemblies grasp the panel edges to initially fasten the clip to a panel.

Each spring tab assembly 70 includes an integral, upwardly extending vertical portion 73 disposed substantially perpendicularly to the clip body 60, and an integral, outwardly curved, substantially horizontal flange portion 77. In clip 41 flange 77 extends towards the rear 65 of the clip in generally parallel, spaced apart relation with respect to the body 60. As best viewed in FIG. 5, the rearward tip 78 of the spring tab flanges is arcuately disposed so as to create a cavity 80 (FIG. 5) into which a piece of wall board may be received. Spacing 84 (FIG. 5) is suitably distanced so that the spring tabs will resiliently compressively engage a board or panel edge. Portion 77 is separated from vertical portion 73 by a weakened, scored edge 71, which permits manual removal of portions 77 after clip installation.

The leading edge 78 of the spring tab horizontal portion 77 is upwardly deflected for a variety of reasons. First, this prevents penetration of the wall board when the clips are installed. The latter feature facilitates manual installation of the clips to a wall or panel edge without the use of special tools or the like. And, as will hereinafter be explained, it thereafter enables manual grasping and breaking-off of the horizontal portion 77.

An inspection of clips 41 will reveal that in this embodiment, the "widest" body area is toward the rear, in which direction the spring tabs 70 project. However, with reference to FIGS. 8–11, an alternative clip 141 appears to facilitate the best mode of the present inventions. For convenience, each of the reference numerals in FIGS. 8–11 are greater than the corresponding reference numerals of FIGS. 3–6 by exactly 100.

The preferred clip 141 comprises a generally planar, elongated body 160 having a length 161, a width 162, a front 164 spaced apart from a rear 165 thereof, and a pair of parallel reinforcement grooves 168 and 169 running the length of the body 160. A pair of spaced apart, prong-like spring tab assemblies, generally designated by the reference numeral 170, are integrally formed on opposite sides of the clip body 160. Each assembly 170 preferably includes an integral, upwardly extending vertical portion 173 disposed substantially perpendicularly to the clip body 160, and an integral, outwardly curved substantially horizontal flange portion 177. Portions 177 are separated from integral companion vertical portions 173 by a scored relief line 171 which again permits manual breakage of the then-unwanted horizontal portion 177 after installation of a clip(s) 141.

Unlike the structure of clip 41 wherein the spring tab assemblies extend towards the rear, spring tab assemblies 170 project towards the clip front 164. As a result, the rearward clip area designated generally by the reference numeral 183 will be exposed for connection to the second (or third) panel(s), rather than being obscured by initial clip attachment to the first wall panel. One benefit of this will be explained hereinafter in conjunction with discussion related to FIG. 12. The forwardly projecting tips 178 of the spring tab flanges 177 are both slightly upwardly curved as before, and a panel-edgereceptive receptive cavity 180 (FIG. 10) is formed. Spacing 184 (FIG. 5) is again approximately equal to or somewhat less than the width of the wall boards being installed. The leading edge 178 of the spring tab horizontal portion 177 is upwardly deflected for the same variety of reasons as explained previously.

To install clips 41 or 141 one may manually grasp the clip and force it such that the spring tab assemblies 70 or 170 each appropriately couple themselves to a wall board edge, with the wall board sandwiched between the parallel portions 77 or 177 and the clip body. Spring-like bias from parallel portions 77 or 177 will at least semi-permanently maintain the clip in a suitable position. As best viewed in FIG. 2, a suitable fastener 90 (i.e. preferably a self tapping screw) has been forcibly installed through the wall board within that region or zone broadly defined between adjacent spring tab flanges 70. When fastener 90 is driven through the wall board, it will engage the perforated body portion of the clip and permanently affix the clip to that wall board. Another fastener 93 is thereafter driven through the next wall board 55 to securely fasten it to the clip.

Before installing fastener 93 the installer will "target" an area of the second wall board immediately proximate board edge 50E (i.e. to the left as viewed in FIG. 2) but between visibly exposed spring tab portions 70. Fastener 93 will thus be aimed properly into the perforated body of clip 41. Clip horizontal portions 77 may then be manually grasped as in FIG. 2, and continued bending will tear them apart from the clip body to prevent unwanted exposure or contact, but remaining clip portion 73 will be hidden between the abutting panel edges. Panel 55 will thus be secured together such that its edge 55E is maintained in closely spaced apart relation relative to board edge 50E.

Thus either clip 41 or 141 may be quickly used to install a pair of abutting panels together in an irregular positions with or without the use of vertical columns as rearward support. Boards may be installed in wall or roof sections either horizontally or vertically, and they may be so installed without the usual cutting and waste of irregularly terminating spaced-apart ends. However, either clip 41 or 141 also provide an additional feature to facilitate the maneuverability of a worker 9 (FIG. 1) who may wish to move a panel 23 into a proper abutting position with a previously installed panel 22. In this case if the plurality of clips 41 or 141 are previously established along lower edge 23E of a panel to be lifted, a gripping action during installation will result so that noone needs to temporarily brace panel 23 during installation.

With reference now to FIG. 7, use of suitable clips 41 or 141 also facilitates convenient or aesthetically pleasing repairs or alterations to wall boards. For example, an interior wall 100 may block a piece of pipe 101 which may require replacement or fixing by a plumber or the like. An inspection hole 103 is thus cut out of the wall, and when piece 104 is removed repairs to the pipe 101 may commence. After suitable repairs, wall piece 104 needs to be reinstalled over inspection orifice 103, but in the absence of support columns 105 104 it has hitherto been extremely difficult in properly bracing gypsum wall board inspection ports. With the addition of with a plurality of clips 41 or 141 as shown, section 104 may be securely held in place within orifice 103 and when screwed into position upon suitable clips, the subsequent application of tape, "mud", and/or sanding and painting will virtually completely cosmetically "fix" wall 100.

With primary reference directed to FIG. 12, one major advantage experienced with the preferred clip 141 relates to the fact that after clamping of the spring tab assemblies 170 over a first panel 191, for example, the exposed area 183 corresponding to width 162 will be larger than that exposed area which would be available to second or third panels with the earlier clip 41. A fastener 192 has been driven through panel 191 in between an adjacent spring tab portion 177. As explained previously these spring tab portions temporarily provide an aiming point for installation of screw 192. After one or more clips 141 are so attached to a panel 191, it becomes possible for a pair of other panels such as panels 196, 197 to be joined to the relatively larger exposed region 183. The larger area of clip region 143 is responsible for this, and it may receive a fastener 198 to hold panel 196, and a similar fastener (not shown) to similarly brace panel 197 in the "three corner" region illustrated in FIG. 12.

Figure 13:
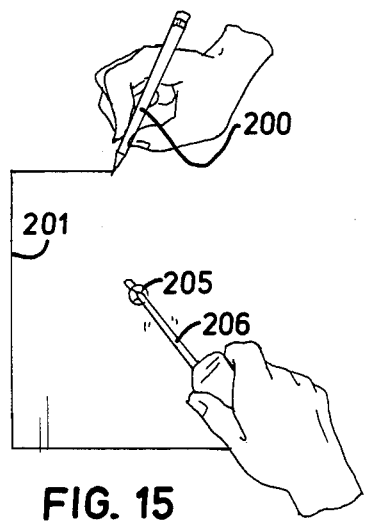
Figure 14:
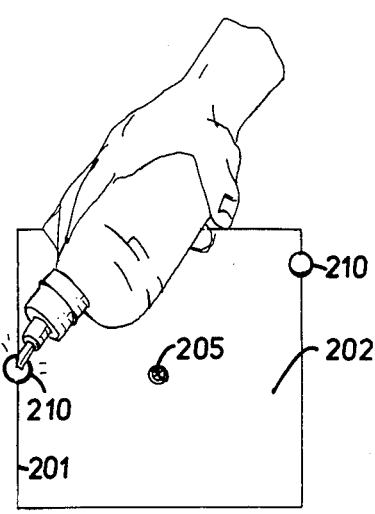
Figure 15:
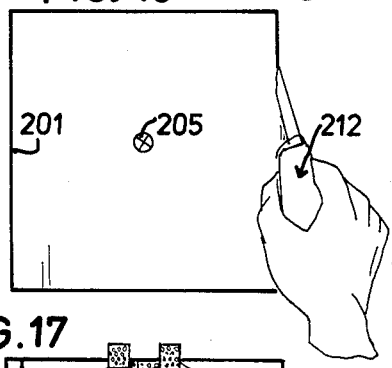
Figure 16:
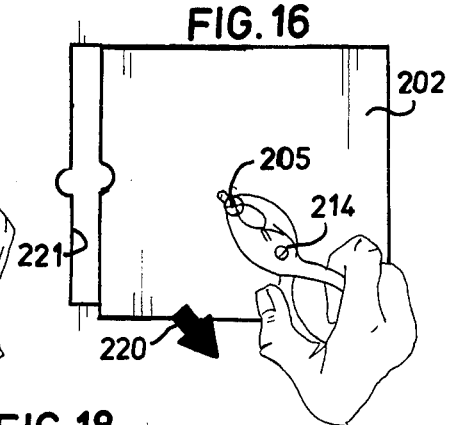
Figure 17:
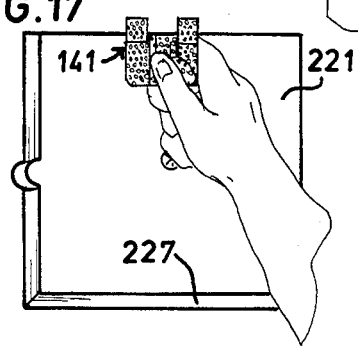
Figure 18:
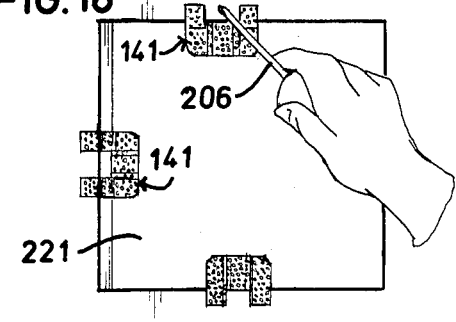

With reference now to FIGS. 13–20, clips 41 or 141 may be employed in conjunction with a repair kit for repairing or replacing a relatively small hole or damaged portion of a wallboard or the like. With reference to FIG. 13, it is contemplated that a conventional pencil or marking implement 200 may be employed first to provide suitable markings 201 so that a panel 202 may be removed. Preferably a temporary fastener such as screw 205 is installed with a screw driver 206. As in FIG. 14, it is desirable to drill a hole 210 somewhere on the border 201. A sabre saw may then be used to cut around the border 201 (FIG. 15) when sawing is completed, a pair of pliers 214 which grasp fastener 205 may remove cut-out 202 by gentle pulling in the direction of Arrow 220, exposing a hole 221.

Figure 19:
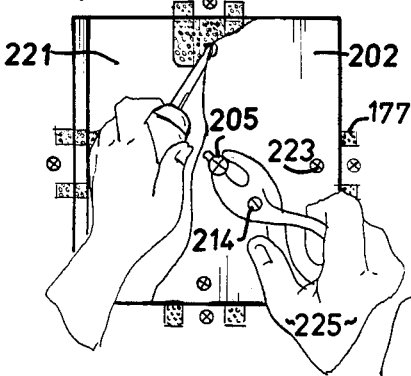
Figure 20:
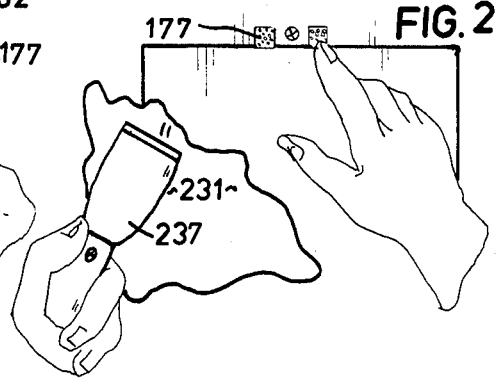

Prior to fixing, a plurality of clips such as clip 141 may be suitably fastened about the edge 227 of the orifice 221. Again a simple screw driver 206 may be employed as in FIG. 18. With reference now to FIG. 19, the cut-out 202 may thereafter be placed over the region 221 and it will "cover" the exposed portions of clip 141 as previously discussed. Fasteners 223 are positioned somewhat between the horizontal spring tab portions and immediately adjacent the prior fastener as previously explained, and fastener installation is facilitated by the perforated character of the clip bodies. Gentle movement of hand 225 with pliers 214 can move the cut out 202 into position for screwing. Afterwards, clip edges 177 are manually broken away as in FIG. 20, and the center holding screw 205 is removed. Appropriate conventional materials 231 may be manually applied thereafter with the finishing tools 237 to facilitate subsequent sanding, and wall painting.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A construction method for securely coupling together adjacent panels of gypsum board, sheet rock, masonite, insulation board, plywood or the like, which panels have abutting finished edges which, during wall assembly, terminate at random positions spaced apart from the wall studs, support columns or the like, said method comprising the steps of:

conventionally installing a first panel upon and between spaced apart studs or vertical support columns during assembly with an exposed edge of said first panel randomly positioned apart from the nearest stud or vertical support column over a hollow region of the wall structure;

applying at least one clip to the exposed, finished panel edge to prepare said first panel for coupling to a second panel finished edge, each of said clips comprising:

a generally planar, perforated body portion adapted to be blindly penetrated by a self tapping screw, said body portion having a length greater than the thickness of said panel(s), a front, a rear, and a pair of spaced apart sides;

prong-like spring tab means integrally projecting from said clip body portion on opposite sides thereof, each of said spring tab means including a vertical portion generally perpendicular to said clip body portion and an integral offset horizontal flange portion oriented generally parallel with said clip body portion adapted to readily frictionally grasp a finished edge of a panel to sandwich same against said clip body; said spring tab flange portions spaced apart from said clip body portion a distance approximately equal to or less than the thickness of said panel;

installing a self-tapping screw through said first panel substantially within a region defined between said spring tab means horizontal portions so as to penetratingly engage said clip body in a substantially random position thus permanently affixing said at least one clip to said first panel;

positioning a second panel having an exposed finished edge immediately adjacent to the exposed finished edge of said first panel over exposed planar portions of said at least one clip with said finished edges of said panels substantially abutting one another;

installing another self-tapping screw through said second panel immediately adjacent said spring tab means horizontal portions so as to permanently couple said second panel to said at least one clip body portion whereby said first and second panels are coupled together along their exposed finished edges with the clip(s) forming the sole backup structure for the adjacent panels without additional mechanical linkage to a stud, support column or the like; and, thereafter manually removing said horizontal flange portions of said spring tab means by bending them until breakage occurs along a predefined scored junction, whereby to ultimately construct an unobstructed wall surface for subsequent finishing.

2. The method as defined in claim 1 wherein the flange portions of said spring tab means are outwardly curved to compressively grip the panel edge when said clip is manually installed and to avoid penetration of the finished panel edge, and to facilitate subsequent manual manipulation, breakage and removal of the spring tab flanges.

3. The construction method as defined in claim 2 wherein said clips include a plurality of parallel reinforcing grooves defined along the length of said clip body portion.

4. A method for securely repairing randomly located holes in panels of gypsum board, sheet rock, masonite, insulation board, plywood or the like without mechanical connection to or support from the internal, spaced apart wall studs, support columns or the like, said method comprising the steps of:

defining and locating a hole in said panel to be repaired;

applying a plurality of clips at spaced apart locations about the internal periphery of said hole to be repaired, each of said clips comprising:

a generally planar, perforated body portion adapted to be blindly penetrated by a self tapping screw, said body portion having a length significantly greater than the thickness of said panel(s), a front, a rear, and a pair of spaced apart sides;

prong-like spring tab means integrally projecting from said clip body portion on opposite sides thereof, each of said spring tab means including a vertical portion generally perpendicular to said clip body portion and an integral offset horizontal flange portion oriented generally parallel with said clip body portion adapted to readily frictionally grasp said panel to sandwich same against said clip body; said spring tab flange portions spaced apart from said clip body portion a distance approximately equal to or less than the thickness of said panel;

whereby a plurality of clips may be initially installed about the periphery of said hole to be repaired;

installing a self-tapping fastener through said wall substantially within regions defined between said spring tab means horizontal portions so as to penetratingly engage each clip body portion to permanently affix them;

positioning an appropriately shaped repair piece within said hole over said clips;

installing a self-tapping fastener through regions of said repair piece immediately adjacent said spring tab means horizontal portions so as to permanently couple said repair piece to said clips whereby said repair piece is permanently secured to the wall within said hole without additional mechanical linkage to a stud, support column or the like; and, thereafter manually removing said horizontal flange portions of said spring tab means by manually bending them until breakage occurs along a predefined scored junction, whereby to ultimately construct an unobstructed wall surface for subsequent finishing.

5. The method as defined in claim 4 wherein the flange portions of said spring tab means are outwardly flared to compressively grip the edges of a hole to be fixed when clips are installed and to facilitate manual manipulation thereof.

6. The method as defined in claim 5 wherein said clips include at least one reinforcing groove defined along the length of said clip body portion.

7. A fastener clip for enabling the coupling together of adjacent panels of gypsum board, sheet rock, masonite, insulation board, plywood or the like which have abutting finished edges which, during construction of a wall, end up randomly positioned relative to spaced apart wall studs, support columns or the like, said clip comprising:

a generally planar body portion comprised of perforated metal, said body portion having a length significantly greater than the thickness of said panel, a front, a rear, a pair of spaced apart sides, and at least one reinforcing groove extending generally along its length;

prong-like spring tab means integrally projecting from said clip body portion on opposite sides thereof for compressively clamping said clip about an exposed edge of said panel, each of said spring tab means comprising:

a vertical portion generally perpendicular to said clip body portion;

an integral, arcuate, offset horizontal flange portion oriented generally parallel with said clip body adapted to readily grasp an edge of a panel and to sandwich same against said clip body without penetrating the panel;

said spring tab flange portions spaced apart from said clip body portion a distance approximately equal to or less than the thickness of said panel; and, said horizontal flange portions of said spring tab means being separated from the vertical portions thereof by a scored junction which facilitates manual bending of said flanges until they break away from said body for removal;

said spring tab flanges generally defining a region about said panel for installing a self-tapping fastener through said panel substantially within said region whereby to penetratingly engage said clip body portion to permanently affix said clip to said first panel; and, said clip body having an exposed portion immediately adjacent to the exposed edge of said first panel over which at least a portion of a second panel may be laid and into which another fastener may be installed to permanently couple two or more panels together.

8. The clip as defined in claim 7 wherein the flange portions of said spring tab means are outwardly flared to compressively grip and avoid penetration of the panel edge when said clip is installed and to facilitate manual manipulation and removal of the flanges.

* * * * *